June 30, 1964 G. F. GRONDIN 3,139,607

SYNCHRONOUS COMMUNICATION SYSTEM WITH NONSYNCHRONOUS TERMINALS

Filed Sept. 25, 1959 11 Sheets-Sheet 1

INVENTOR.
GEORGE F. GRONDIN
BY Moody and Goldman
ATTORNEYS

INVENTOR.
GEORGE F. GRONDIN
BY Moody and Goldman
ATTORNEYS

June 30, 1964 G. F. GRONDIN 3,139,607

SYNCHRONOUS COMMUNICATION SYSTEM WITH NONSYNCHRONOUS TERMINALS

Filed Sept. 25, 1959 11 Sheets-Sheet 3

INVENTOR.
GEORGE F. GRONDIN
BY Moody and Goldman
ATTORNEYS

SYNCHRONOUS COMMUNICATION SYSTEM WITH NONSYNCHRONOUS TERMINALS

Filed Sept. 25, 1959 11 Sheets-Sheet 4

INVENTOR.
GEORGE F. GRONDIN
BY Moody and Goldman
ATTORNEYS

INVENTOR.
GEORGE F. GRONDIN
BY Moody and Goldman
ATTORNEYS

INVENTOR.
GEORGE F. GRONDIN
BY Moodgend Goldman
ATTORNEYS

INVENTOR.
GEORGE F. GRONDIN
BY Moody and Goldman
ATTORNEYS

SYNCHRONOUS COMMUNICATION SYSTEM WITH NONSYNCHRONOUS TERMINALS

Filed Sept. 25, 1959 11 Sheets-Sheet 8

INVENTOR.
GEORGE F. GRONDIN
BY Moody and Holleman
ATTORNEYS

SYNCHRONOUS COMMUNICATION SYSTEM WITH NONSYNCHRONOUS TERMINALS

Filed Sept. 25, 1959 11 Sheets-Sheet 9

INVENTOR.
GEORGE F. GRONDIN
BY Moody and Goldman
ATTORNEYS

June 30, 1964 G. F. GRONDIN 3,139,607

SYNCHRONOUS COMMUNICATION SYSTEM WITH NONSYNCHRONOUS TERMINALS

Filed Sept. 25, 1959 11 Sheets-Sheet 10

INVENTOR.

GEORGE F. GRONDIN

BY Moody and Goldman

ATTORNEYS

SYNCHRONOUS COMMUNICATION SYSTEM WITH NONSYNCHRONOUS TERMINALS

INVENTOR.
GEORGE F. GRONDIN
BY Moody and Goldman
ATTORNEYS

United States Patent Office 3,139,607
Patented June 30, 1964

3,139,607

SYNCHRONOUS COMMUNICATION SYSTEM WITH NONSYNCHRONOUS TERMINALS

George F. Grondin, Van Nuys, Calif., assignor to Collins Radio Company, Cedar Rapids, Iowa, a corporation of Iowa Filed Sept. 25, 1959, Ser. No. 842,299
12 Claims. (Cl. 340—172.5)

The invention relates to adapting nonsynchronous binary data "readers" and "writers" to a synchronous communication system.

The term "reader" is used herein in a general sense to include devices that sense holes perforated cards and paper tape or recorded binary-magnetization changes and that produce corresponding electrical impulses. Likewise, the term "writer" is used herein to include devices capable of punching holes or magnetizing magnetic material in response to a received digital signal.

The invention operates nonsynchronous electro-mechanical readers and writers in their normal nonsynchronous modes. Yet, presently available nonsynchronous readers and writers are not stable in their rate of operation. The data rate of any one machine will vary between maximum and minimum values, depending on such variable factors as input voltage changes, stabilities of component parts, etc. Presently available punched-card readers and writers actually vary by about 10% around their nominal rates. Hence, a nominal data rate given for a machine is merely an approximate rate.

It is the principal object of this invention to enable such unstable reading and writing devices to be connected into a bit-synchronous communication system without servo control.

A synchronous communication system that may be used with the invention is described and claimed in Patent No. 2,886,884 filed April 16, 1955, by Melvin L. Doelz, et al., titled "High Information Capacity Phase-Pulse Multiplex System," assigned to the same assignee as the present application.

Primary advantages of a bit-synchronous communication system are greater economy of bandwidth and a better signal-to-noise ratio than are obtainable with a bit-synchronous communication system under the same transmission conditions. For example, a voice-quality telephone line can have its information capacity approximately doubled by utilizing a synchronous transmission means. However, most important to many types of communication is the improvement of received signal-to-noise ratio by a synchronous system over a non-synchronous one. For example, a single error may invalidate an entire punched card, which may contain as many as several hundred bits of information. Hence, a system which minimizes error is preferable.

A model of the invention can communicate a nominal 100 punched cards per minute, over a single voice-quality telephone line, almost without error.

For definition purposes, data is transmitted in the invention as a sequence of groups. Each group is comprised of data blocks (subgroups) which are separated by "spacer" periods, during which no data is transmitted. Hence a block is a sequence of data bits, without any intervening spacer periods. However, a spacer period may contain directions to the writer, which do not result in any written data. Generally, a long spacer time separates groups and a short spacer time separates blocks within a group.

Although the invention operates with bit-synchronism, it does not require either block or group synchronism. That is, the invention can tolerate significant variations in its transmitted block or group data rates.

The invention provides two general types of rate coordination: First, the invention coordinates the maximum and minimum nonsynchronous rates of its reader and writer. Secondly, the invention coordinates its bit-synchronous transmission rate with the nonsynchronous reader and writer data rates.

Accordingly, the first coordination requires that the minimum group write rate is never exceeded by the maximum group read rate of the system. However, the read rate may be any amount slower than a maximum permissible amount for a given system. This eliminates the need for exorbitant storage capacity at the receiver. Storage capacity for one data block is all that is required at the transmitter. Data from the reader is simultaneously read out and stored one block at a time, nonsynchronously. It is then transmitted bit-synchronously from the block storage.

The second coordination requires that the synchronous transmission rate must be fast enough to clear the block storage prior to nonsynchronous read-in of the next data block. The transmission data rate is therefore dependent upon a maximum group read rate, F.

However, the synchronous bit-timing rate of the system can be reduced by using parallel channels. Thus, if there are B bits per block and N parallel channels, it takes $B/N$ bit periods to transmit a block, as compared to B bit-periods to transmit a block with a single channel. Where parallel channels are used, the simultaneous bits transmitted during any bit-period are herein called a "word," which defines a term often used in this specification.

Where an average number S of spacer bit-periods are required in the spacer time between adjacent blocks in a group that has P number of blocks, the minimum synchronous transmission bit-rate is $$FP\left(\frac{B}{N}+S\right)$$

Any excess over this minimum transmission rate provides additional spacer time between data blocks and groups in the operation of the invention.

Buffer storage is provided at the receiver in order to delay operation of the writer before it begins writing a received data group. Initial delay prevents the writer from ever overtaking the incoming data of a group, provided from a slower reader. Overtaking would cause blank periods to be readout from storage which may be mistaken for data. Accordingly, after an initial delay period, the writer is started and proceeds nonsynchronously to write an entire group from buffer storage. At the end of the data group, the writer is stopped and is made to await the end of the next delay period.

The amount of buffer storage needed is dependent on the relationship between the maximum write rate and the minimum read rate of the nonsynchronous devices. Buffer storage is minimized by having the tolerances as small as possible.

Further objects, features and advantages of this invention will be apparent to one skilled in the art upon further study of the specification and the accompanying drawings, in which:

FIGURE 1 is a generalized block diagram of the system of the invention;

FIGURES 2(A) and (B) illustrate timing diagrams used in explaining fundamentals of the invention;

FIGURES 6 and 7 illustrate portions of FIGURE 5 in more detail;

Figure 5:
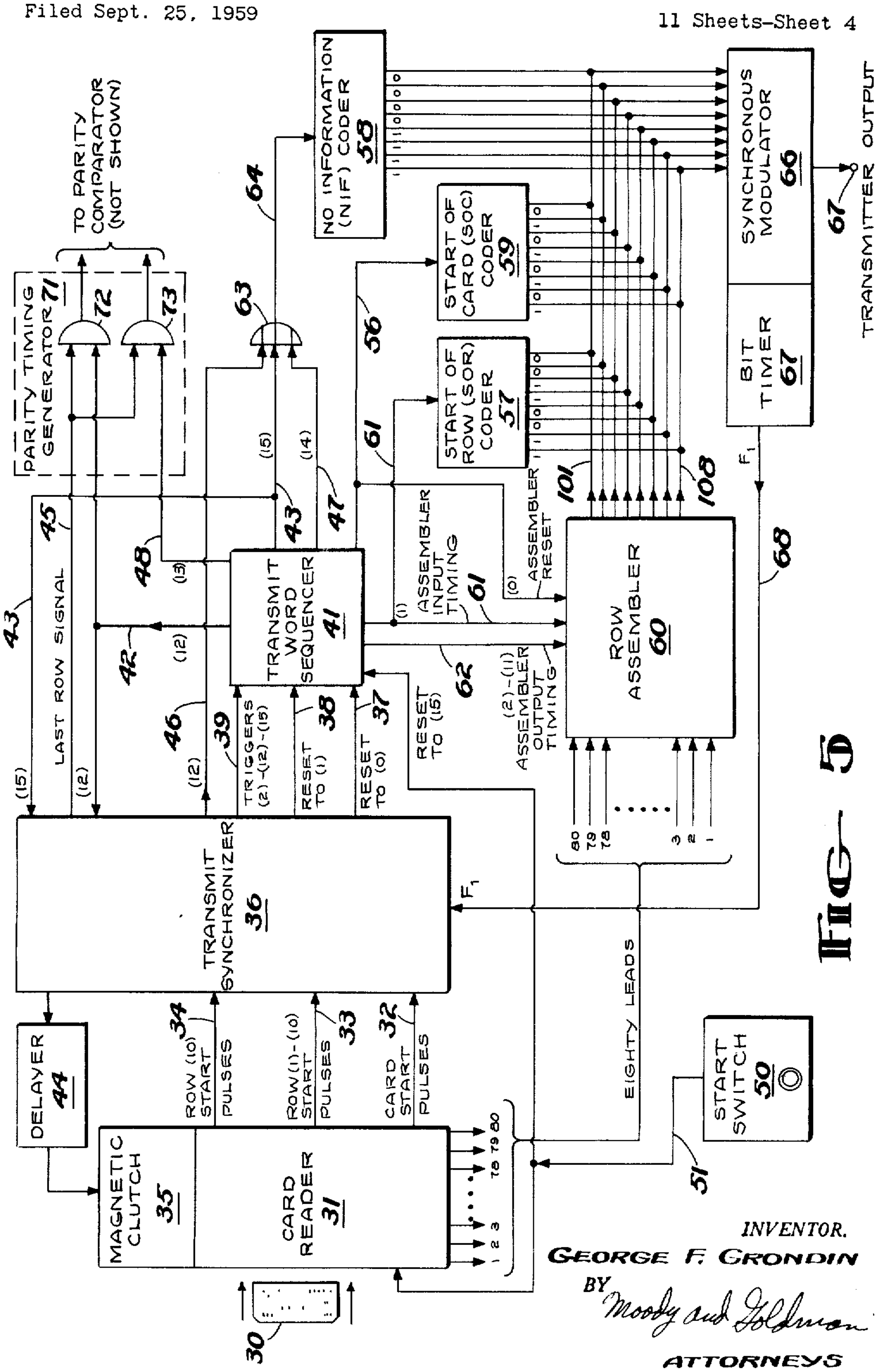
FIGURE 5 shows an embodiment of a transmitting portion of the invention.
Figure 11:
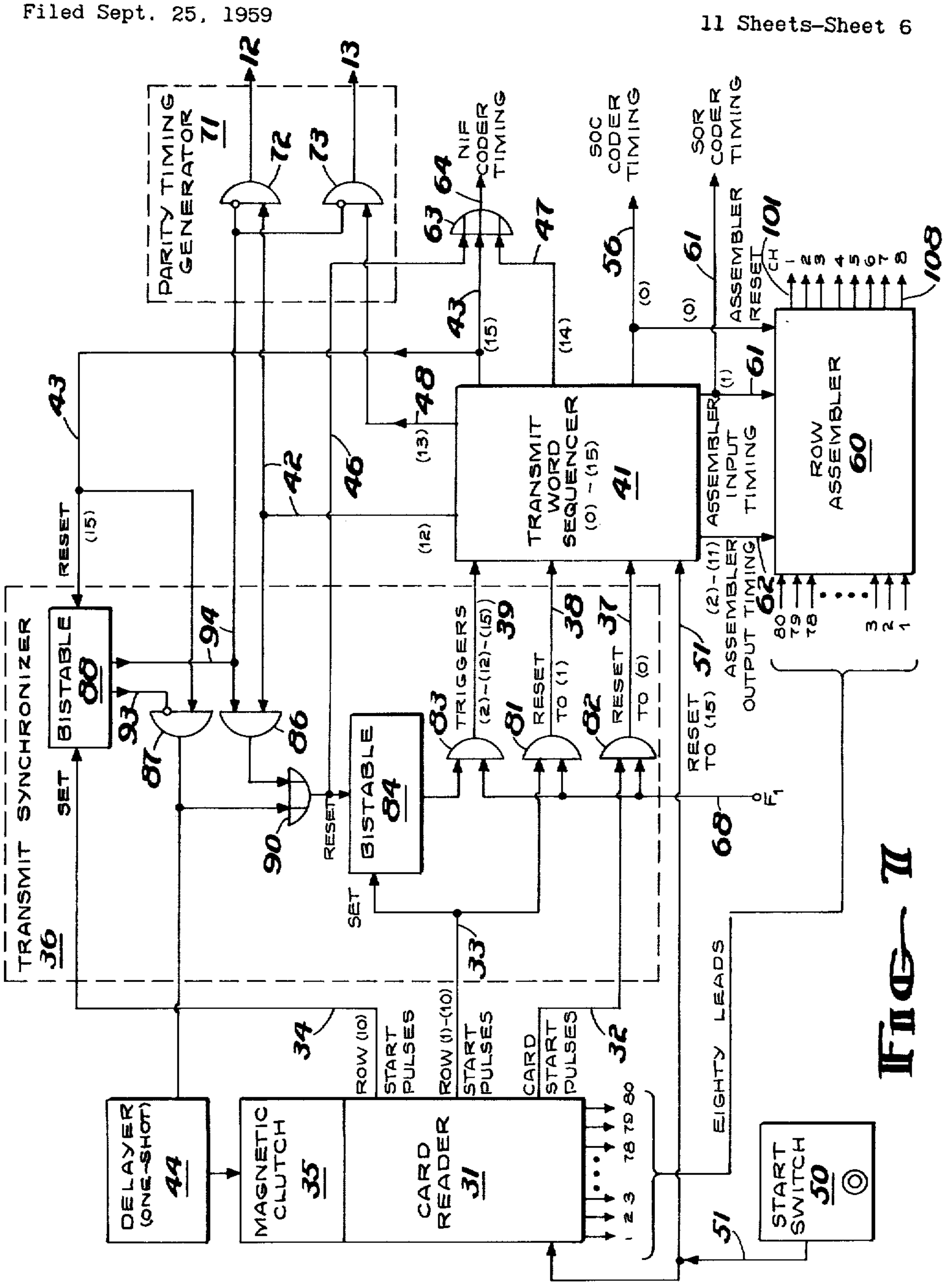
Figure 8:
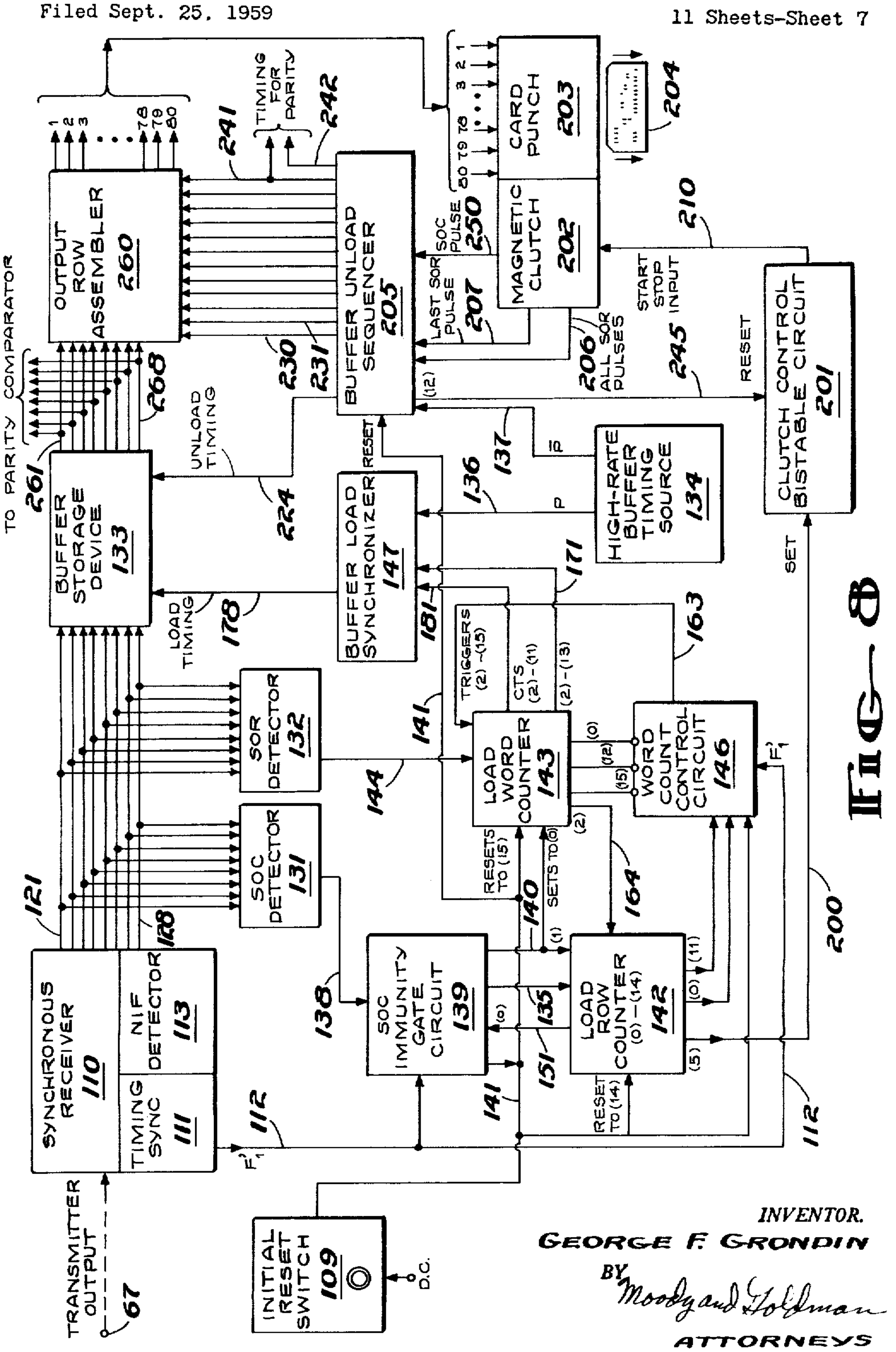
FIGURE 8 is an embodiment of a receiving portion of the invention for transcribing the information received from the embodiment of FIGURE 5.
Figure 9A:
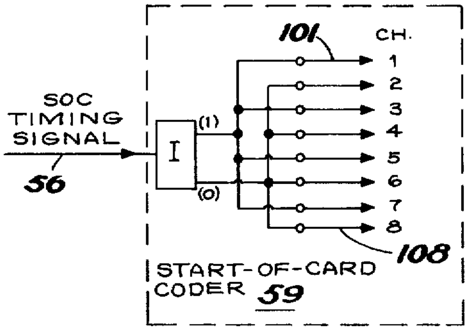
Figure 10A:
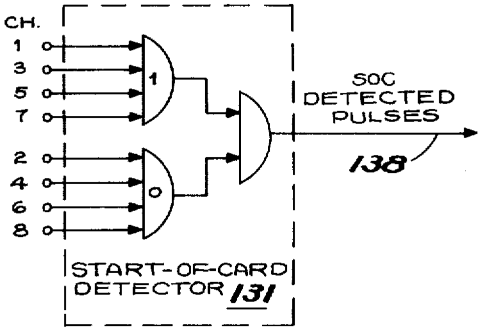
Figure 9B:
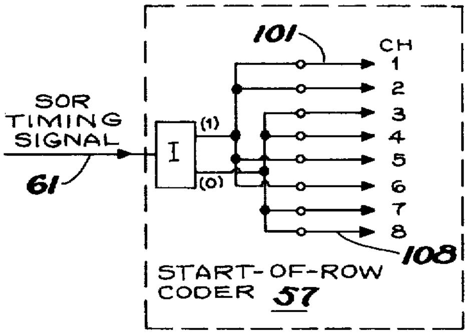
Figure 10B:
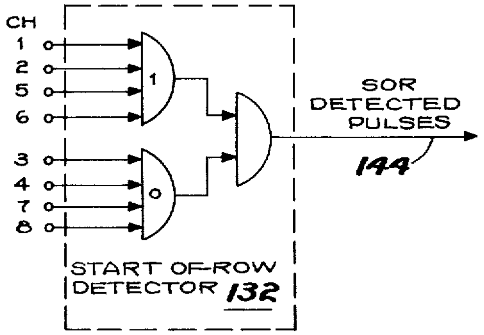
Figure 9C:
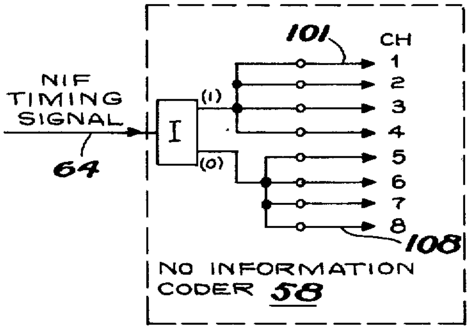
Figure 10C:
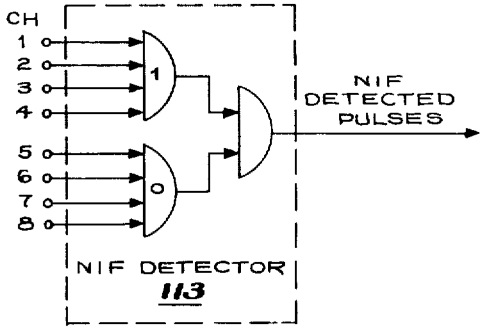
Figure 11:
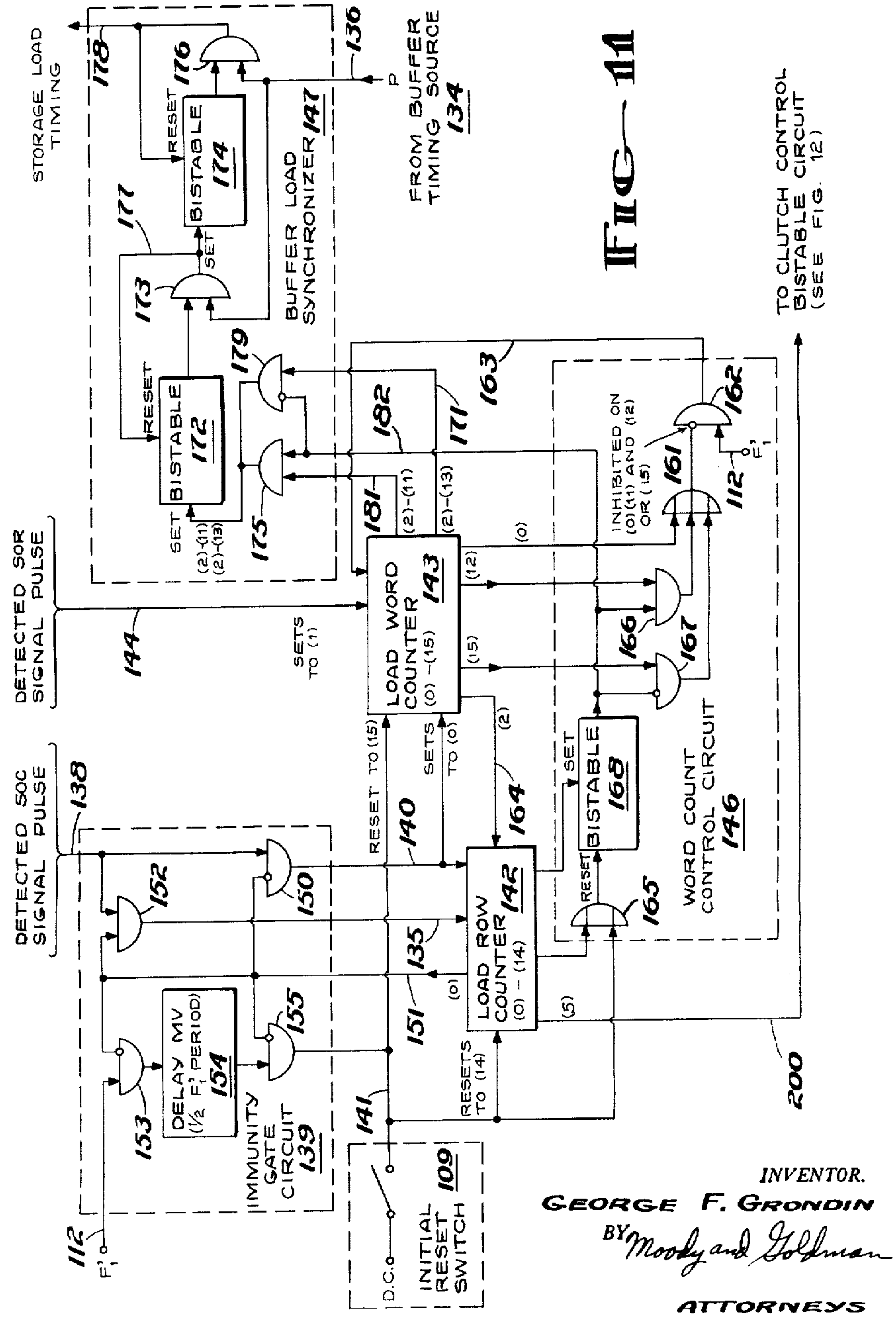
Figure 12:
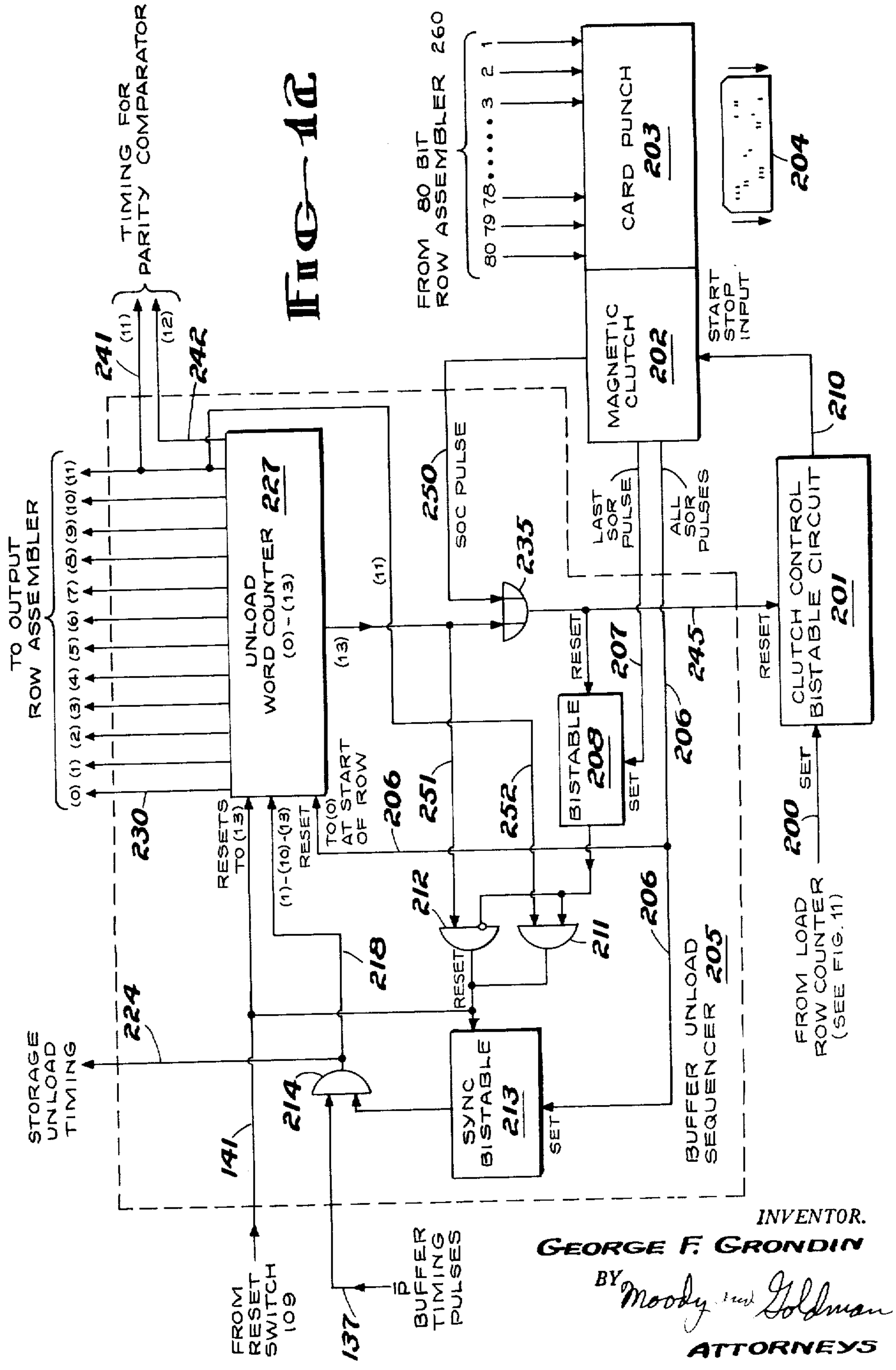
Figure 13:
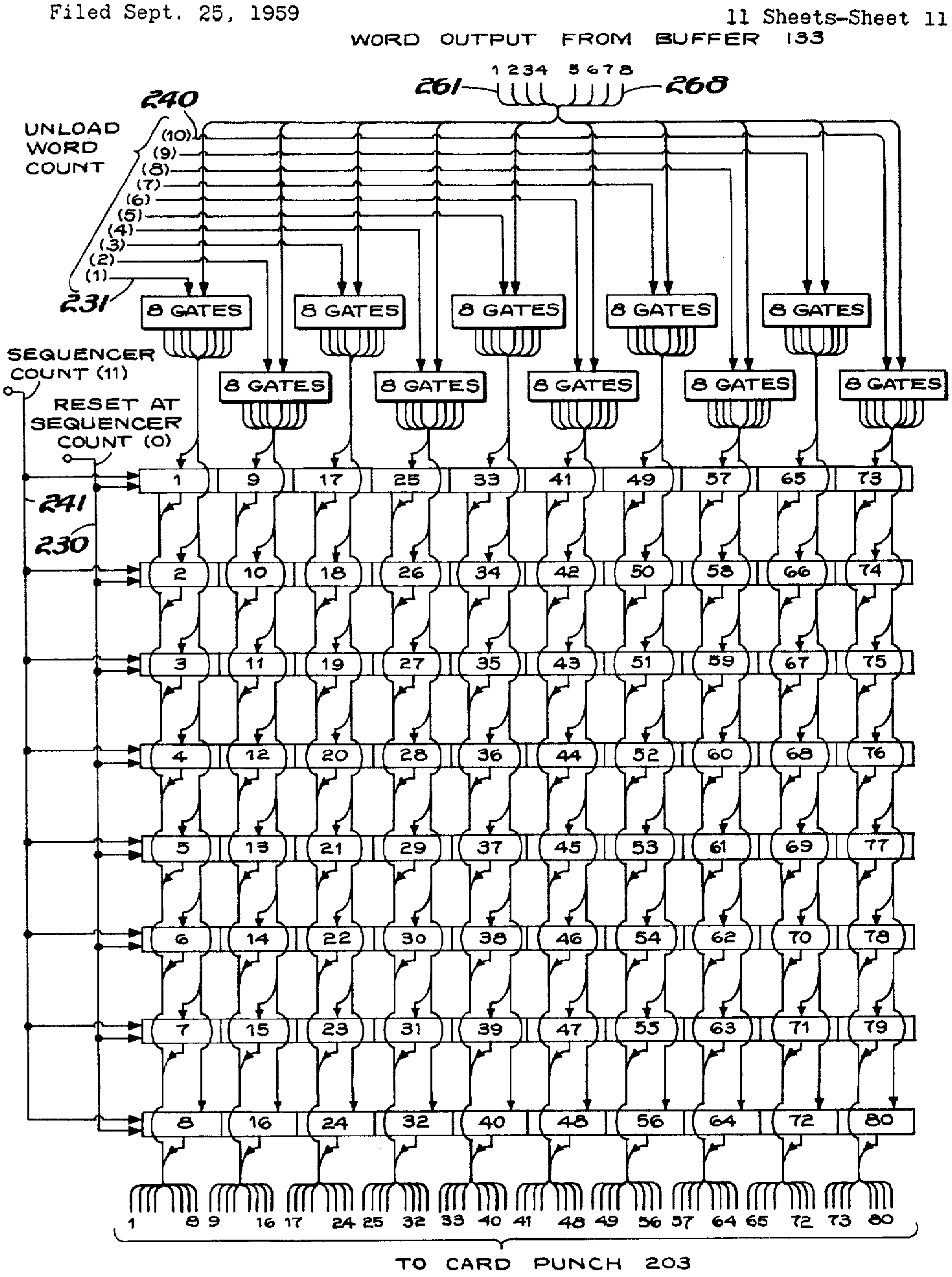

FIGURES 9(A), (B), and (C) show particular coding circuitry which might be used in the system shown in FIGURE 5;

FIGURES 10(A), (B), and (C) illustrate particular detectors which might be found in the system of FIGURE 9; and FIGURES 11, 12 and 13 show in more detail portions of FIGURE 8.

The figures are now considered.

Figure 1:
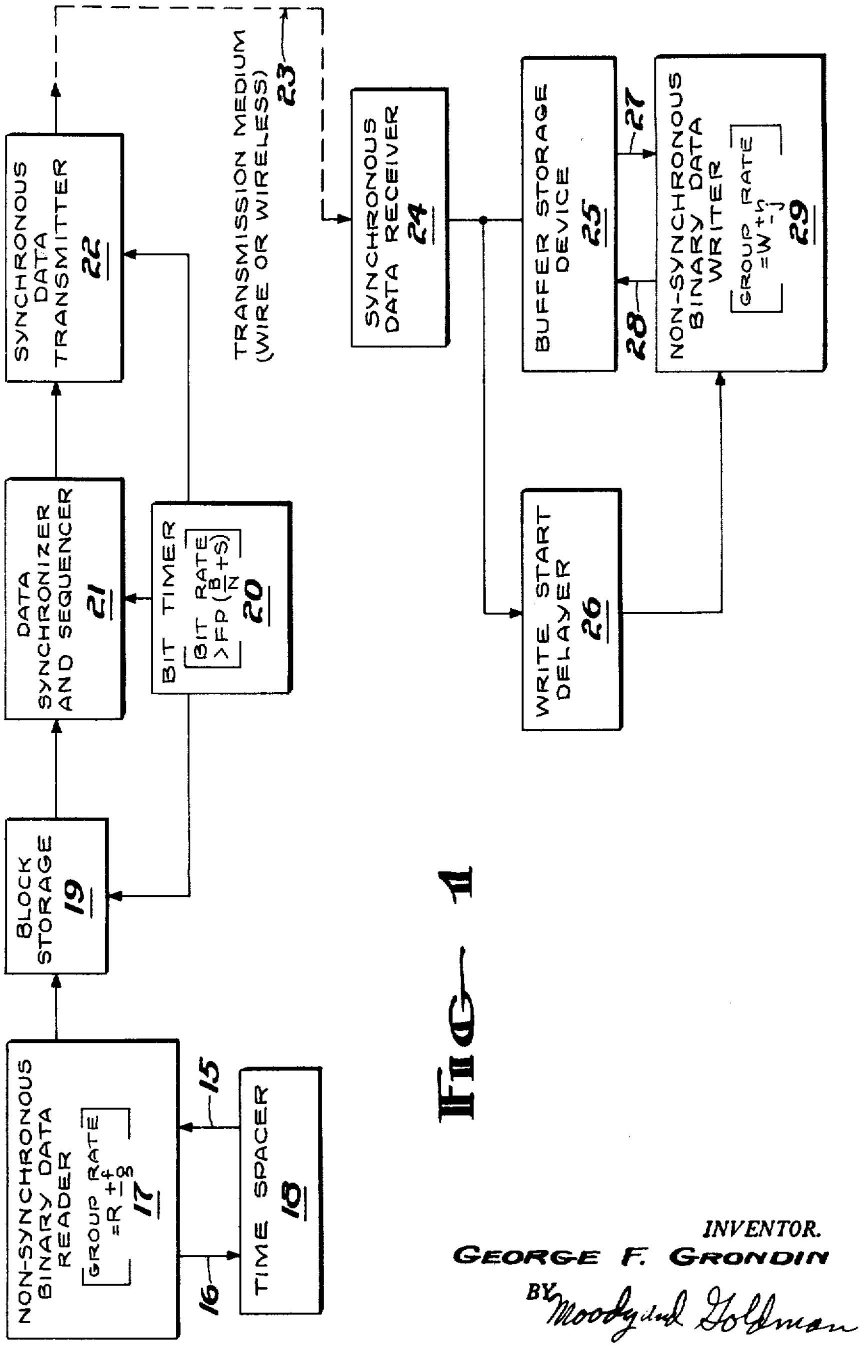

FIGURE 1 illustrates the general system of the invention. It includes a nonsynchronous binary data reader 17 located at a transmitting terminal, and a nonsynchronous binary data writer 29 located at a receiving terminal. They may operate with perforated cards, or tape, etc. to duplicate the information at opposite terminals. For example, if perforated-card information is being read, the data writer might punch out a set of identical cards.

These nonsynchronous devices are indirectly connected to a synchronous communication system; which is represented in FIGURE 1 by a synchronous-data transmitter 22 and a synchronous-data receiver 24, that are connected by a transmission medium 23 such as a telephone wire and/or a radio link or any facilities capable of communicating voice.

Since the data reader and writer are nonsynchronous, they have certain rate tolerances. In FIGURE 1, reader 17 has a nominal group data rate R, but its actual group data rate may vary anywhere between a maximum rate $(R+f)$ and a minimum rate $(R-g)$.

Likewise, the group rate of writer 29 has a nominal value W and varies between a maximum group write rate $(W+h)$ and a minimum rate $(W-j)$.

A time spacer 18 has an output 15 that momentarily stops the operation of reader 17 between blocks or groups, so that the maximum group read rate $(R+f)$ of the reader cannot exceed the minimum group write rate $(W-h)$ of the writer. In order for spacer 18 to know when to insert momentary pauses, it has an input 16 that signals the end of a block or group, as required. Nevertheless, within a group period, it is permissible for the reader to momentarily exceed the group rate without causing difficulty in the invention.

The data is provided nonsynchronously a block at a time from reader 17 to a block-storage device 19. It is then read out of device 19 at the synchronous rate of the system, which exceeds a minimum bit rate $$FP\left(\frac{B}{N}+S\right)$$

A bit-timer 20 sets the synchronous bit rate of the system.

A data synchronizer and sequencer 21 is interposed between the output of block-storage device 19 and transmitter 22. Sequencer 21 controls the read-out of data from block-storage device 19 so that it is bit-synchronized and in the proper order for transmission.

The data may be transmitted entirely in series or in parallel form, depending on the number of independent channels available and the rate required for timer 20. Thus, medium 23 may simultaneously carry information on N number of parallel channels. Hence, there will be N information-bits to a "word," and $B/N$ "words" to a data block.

A buffer storage device 25 and a delayer 26 are provided at the receiver to prevent the binary writer from overtaking the reader, because then blanks would be written which could be mistaken for data. Thus, the long-term or group data rate of the reader should never exceed that of the writer. The amount of buffer storage needed must exceed the number of information bits transmitted at the maximum read rate over the time $$\left(\frac{1}{R+f}-\frac{1}{W-j}\right)$$

Figures 2A, 2B:
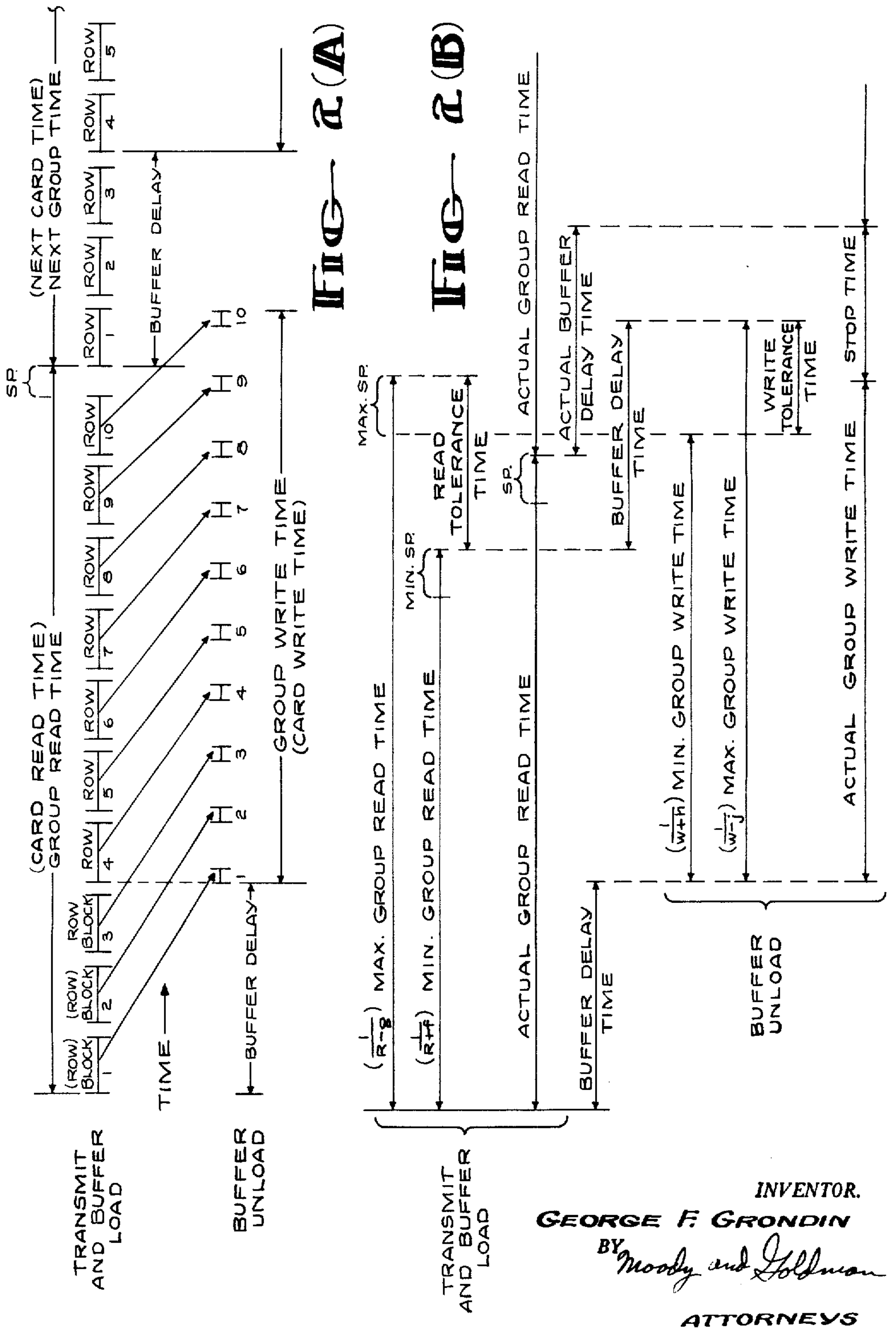

FIGURE 2(A) illustrates the operation of buffer storage device 25 and delayer 26. It shows an example of a group having ten data blocks. The time relationship between the group read time and the group write time is observable, since FIGURE 2(A) is drawn with a time scale. Note that writing of a group is not begun until the start of the fourth block in the transmitted group. Hence, a buffer delay exists for the writing function between the start of a received group and its fourth block.

Since the writer always runs faster on the average than the reader, the unloading by the wrtier from the buffer storage (buffer unload) will gain on the transmitted data (buffer load); so that when the last block of a group is received, the delay between its reception and writing will be much less than for the first block.

It is axiomatic that the last block cannot be written *before* its reception. Hence, the minimum group write time occurs where there is almost no delay between the reception and writing of the last block of a group.

Further, the last block cannot be read out of storage *after* the delay period, because it would then interfere with the writing period of the next group. Thus, a maximum group write time occurs when the last block of a group is written toward the end of the delay time for the next group.

FIGURE 2(B) illustrates the limiting group-time relationships between the read and write functions as determined by the instabilities of the reader and writer. The group read times shown therein include spacer times (SP) at the ends of the read groups, and the reader may be stopped momentarily there by time spacer 18. However, the group write times shown therein do *not* include spacer times at their ends, because the writer is stopped entirely during the time it ends one group and begins the next. Hence, a "stop time" follows each written group. Nothing is written during the "stop time," although other functions of the writer may continue, such as moving the material on which the writing occurs.

The relationship between the "maximum group write time" and the "minimum group read time" is readily apparent, since they are equal, including the spacer time which provides a safety factor. Thus, we may write:

$$\text{Minimum Group Read Time}=\text{Maximum Group Write Time} \quad (1)$$

For a given pair of reading and writing machines, the "minimum buffer delay time" is determined by the difference between the "maximum group read time" and the "minimum group write time."

$$\text{Minimum Buffer Delay Time}=\text{Maximum Group Read Time}-\text{Read Group Spacer Time}-\text{Minimum Group Write Time} \quad (2)$$

An "actual buffer delay time" is chosen to be any amount greater than the minimum, but for economy reasons may be kept close to the minimum. However, increasing the buffer delay time beyond the minimum provides a safety factor.

The "read tolerance time" is hence the difference between the maximum and minimum group read times. Likewise, the "write tolerance time" is the difference between the maximum and minimum group write times. Consequently, an "actual group read time" and an "actual group write time" will fall somewhere between the respective maximum and minimum values.

The various group times in FIGURE 2(B) can be converted to group rates by taking the reciprocal of a group time. Thus, a maximum group time yields a minimum rate and vice-versa a minimum group time yields a maximum rate. Hence, by using the time relationships of Expression 1:

$$\text{Maximum Group Read Rate} = \text{Minimum Group Write Rate} \quad (3)$$

The minimum read rate and maximum write rate are dependent upon the choice of buffer delay time. On the one hand, the buffer delay time may be made a constant amount that always begins at the start of reception of a group. Or, on the other hand, the delay time may be a fixed fraction (K) of a received group and vary with group variation. Where the buffer delay time is a fixed fraction (K) of each received group and where the spacer time at the end of a group is a fixed fraction (U) of the group:

$$\text{Minimum Group Read Rate} = (1-U-K)\ (\text{Maximum Group Write Rate}) \quad (4)$$

Figure 4:
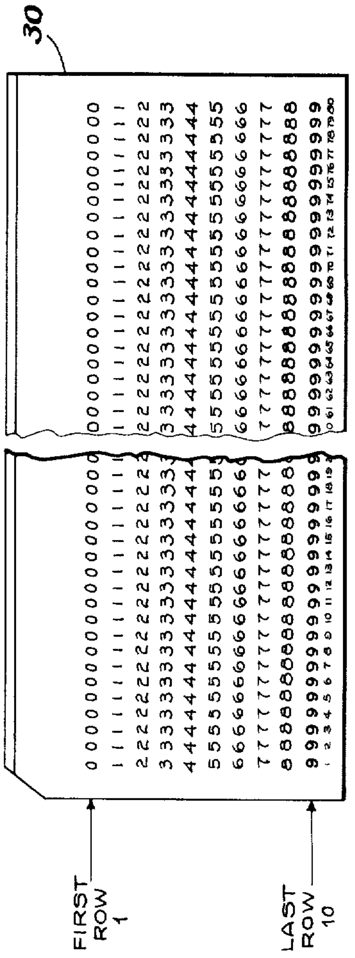
FIGURE 4 illustrates a punched-card of the type that provides the information represented in the format of FIGURE 3.

A detailed embodiment of the invention is illustrated by FIGURES 5–13. It concerns a system for communicating the data of perforated cards. A perforated card is illustrated in FIGURE 4. It has ten rows arranged horizontally, and each row is presumed to have a capacity of eighty information-bits designated by the presence and absence of holes at various numbered positions of the card.

Figure 3:
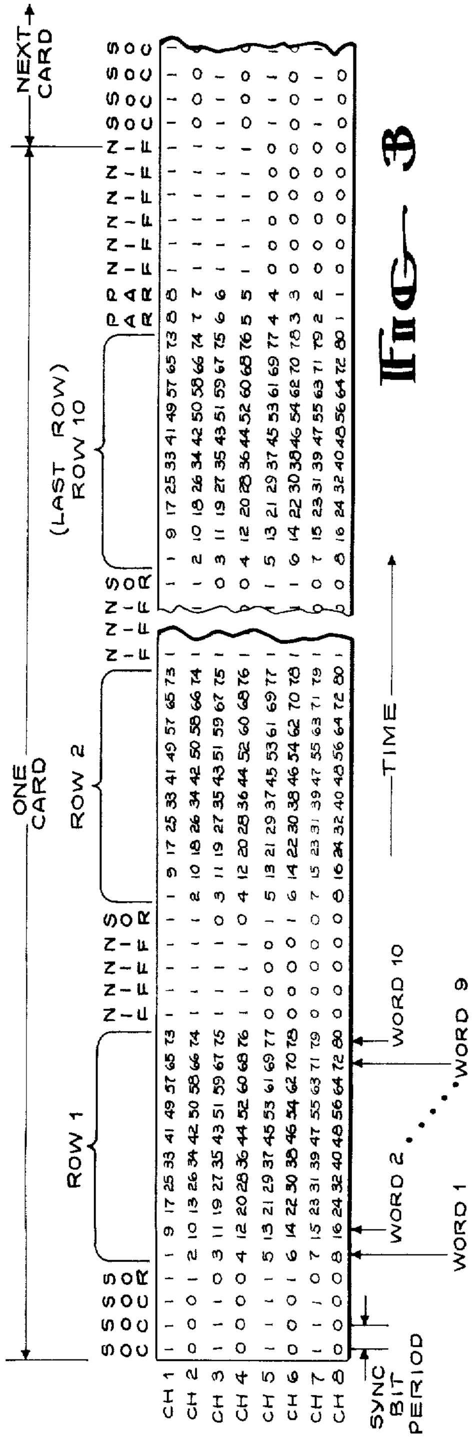
FIGURE 3 illustrates a format used by the invention for transmitting punched-card information.

FIGURE 3 illustrates a format used by the detailed embodiment of the invention to synchronously transmit punched card information. The information on the entire card is considered a data "group" within the preceding usage of the term. Furthermore, each row on the card provides a data "block" within the preceding definition of the term.

FIGURE 3 shows eight synchronous communication channels. Hence there are eight bits to a "word" and ten "words" to a row (block). Accordingly, each row on the card is transmitted as a data block of ten consecutive "words," each having eight information bits. The start of a card is signified in the format by consecutive start-of-card (SOC) "words." Each SOC word is arbitrarily coded 10101010 in channels 1 through 8 ,respectively. Following the SOC words, each row is immediately preceded by a start-of-row (SOR) "word" coded 11001100, which is arbitrary, except that it must be different from the SOC words, so that they can be recognized distinctly. The first word in each data block represents the first eight bits of a row, the next word being the next eight bits, until the tenth word represents the last eight bits (73–80) of the row. Hence, ten bit periods (word periods) are required for the transmission of each row of information. Following each row, spacer gaps are provided. The spacer gaps are filled with no-information (NIF) words, where SOC and SOR words are insufficient to fill the spacers. The amount of time filled in by NIF words is dependent upon the difference between rate of operation of the nonsynchronous reader and the bit rate of the synchronous transmitter. Furthermore, at the end of last row 10, two parity words are transmitted in the space between groups (cards). One parity word is obtained from the odd numbered words of all rows of the card, while the other parity word is obtained from all of the even numbered words of the same card.

The spacing between groups (cards) is greater than between blocks (rows) because more time is needed for the reader machine to eject one card and insert another than is required to shift from one row to the next in the same card.

Accordingly, as soon as a new card is injected into the machine, SOC (start of card) words are transmitted until the card is in position for reading the first row, at which time an SOR pulse is provided; and the sequence continues from row to row until the entire card is read.

TRANSMITTING SYSTEM EMBODIMENT

FIGURE 5 illustrates an embodiment of the invention for nonsynchronously reading and synchronously transmitting card information. It includes a card reader 31, which is electromechanically controlled by a magnetic clutch 35.

A start switch 50 having a momentary pushbutton is used to start the communication process. Previously, the receiving terminal is contacted to assure that it is set with a stack of blank cards at the writer. By pressing switch 50, the card reader begins its nonsynchronous reading of cards stacked within it, and their synchronous transmission commences.

The card reader in FIGURE 5 may be similar to a standard IBM 523, gang-summary punch preset with a 14 point clutch, so that the cards are moved through the machine in their short direction, one row at a time. Thus, each row of 80 bits is read at a single instant, and only 14 basic movements are needed by this machine for reading an entire card. That is, ten movements are required to read the ten respective rows, and the remaining movements are not required, but are used only to complete the reader's cycle. A card reader of this type transmits a signalling pulse at the beginning of each basic movement. Accordingly, it transmits a nonsynchronous start-of-card pulse at the introduction of a card into the machine. Output lead 32 carries this pulse. It follows with nonsynchronous start-of-row pulses at the beginning of each of the ten rows, which are carried by a lead 33. Additionally, a lead 34 carries only the start pulse of the last row 10 on the card. The start pulse of the last row is needed for signalling parity information.

A transmit synchronizer 36 receives the nonsynchronous pulses carried by leads 32, 33 and 34. In addition, a lead 68 provides it with synchronous timing pulses at a rate $F_1$ from a bit timer 67, that may be included with a synchronous modulator 66. Transmit synchronizer 36 synchronizes the relatively long card-start and row-start pulses from the reader with the bit timing $F_1$ by "and" gating them. After a synchronized start-of-row pulse, ten $F_1$ pulses are passed to control the timing of the ten words making up a transmitted row.

A transmit word sequencer 41 cooperates with synchronizer 36 to sequence the information according to the format of FIGURE 3. Sequencer 41 with synchronizer 36 provides the function of synchronizer-sequencer 21 in FIGURE 1.

A row assembler 60 in FIGURE 5 provides the equivalent of block storage 19 in FIGURE 1. It has 80 input leads connected to 80 output leads of card reader 31 to receive simultaneously the information of a single row. It will be briefly described for the present, since it is later explained in detail in connection with FIGURE 6. It comprises eight shift registers, each having ten bits of storage for a total of 80 bits. They have parallel inputs connected to the 80 row leads from reader 31, so that they are loaded simultaneously at a start-of-row pulse. The output of each shift register provides the synchronous output for a single channel. During the ten $F_1$ pulses following the start-of-row pulse, the information is shifted synchronously out of the respective shift registers into the assigned channels.

Sequencer 41 directly controls the sequencing of information into and out of row assembler 60, as well as the sequencing of SOC, SOR, and NIF words between the transmitted rows. Sequencer 41 is a counter which is reset to (15) by switch 50. Then, it is reset to zero by a synchronized start-of-card (SOC) pulse from lead 37. When reset to zero, it provides an output on lead 56 which activates a start-of-card coder 59 that provides SOC words on leads 101–108 to a synchronous modulator for transmission. Due to timing operations within synchronizer 36, the zero reset of sequencer 41 remains for at least two word periods so that at least two SOC words are transmitted. Thereafter, it is reset to one by each synchronized start-of-row (SOR) pulse from lead 38. When sequencer 41 is reset to one, its output on a lead 61 activates a start-of-row coder 57 that causes transmission of an SOR word. Sequencer 41 remains at count one for only one word period so that only one SOR word is transmitted. However, sequencer 41 receives eleven timing pulses $F_1$ after each row count one. The eleventh $F_1$ pulse triggers it one count beyond the last word count needed to transmit the ten words in a row. Sequencer 41 remains on this last count until it is reset to count (1) by the next SOR pulse from lead 38 in response to the beginning of the next row by reader 31. While sequencer 41 remains on the last count, it causes an output on a lead 42 and a lead 46 via synchronizer 36 through an "or" gate 63 to activate a no-information coder 58. While activated, NIF coder 58 provides NIF words through leads 101–108 to synchronous modulator 66. Hence, NIF words fill in the transmission between data blocks.

Synchronizer 36 and sequencer 41 respond somewhat differently on the last row of a card than for the previous rows because parity information is transmitted only at the end of the last row. Lead 34 provides a reader pulse only at the beginning of the last row of a card. This pulse signals synchronizer 36 and sequencer 41 to respond in a special manner. It causes more $F_1$ pulses to be distributed on lead 39 to sequencer 41 so that it counts higher than for other rows to provide parity timing.

The next two counts time the parity information and are selected with the assistance of a parity timing generator 71. Furthermore, due to the extra time needed for the extra counts, reader 31 must be delayed from starting a new card (group) until operations for the present card are completed. Thus, on the last row, a delayer 44 is signalled by synchronizer 36 to provide an inhibiting input to magnetic clutch 35. Operation of reader 31 is halted for a period of output from delayer 44. Delayer 44 provides the function of time spacer 18 in FIGURE 1, because it slows down the reader's group rate by effectively lengthening the minimum group read time in FIGURE 2. Hence, the amount of delay of delayer 44 is dependent upon the rate conditions given in connection with FIGURE 1 and by Expression 1 above.

Component parts of the transmit portion of the invention in FIGURE 5 are explained in more detail by the following:

*Row Assembler 60*

Figure 6:
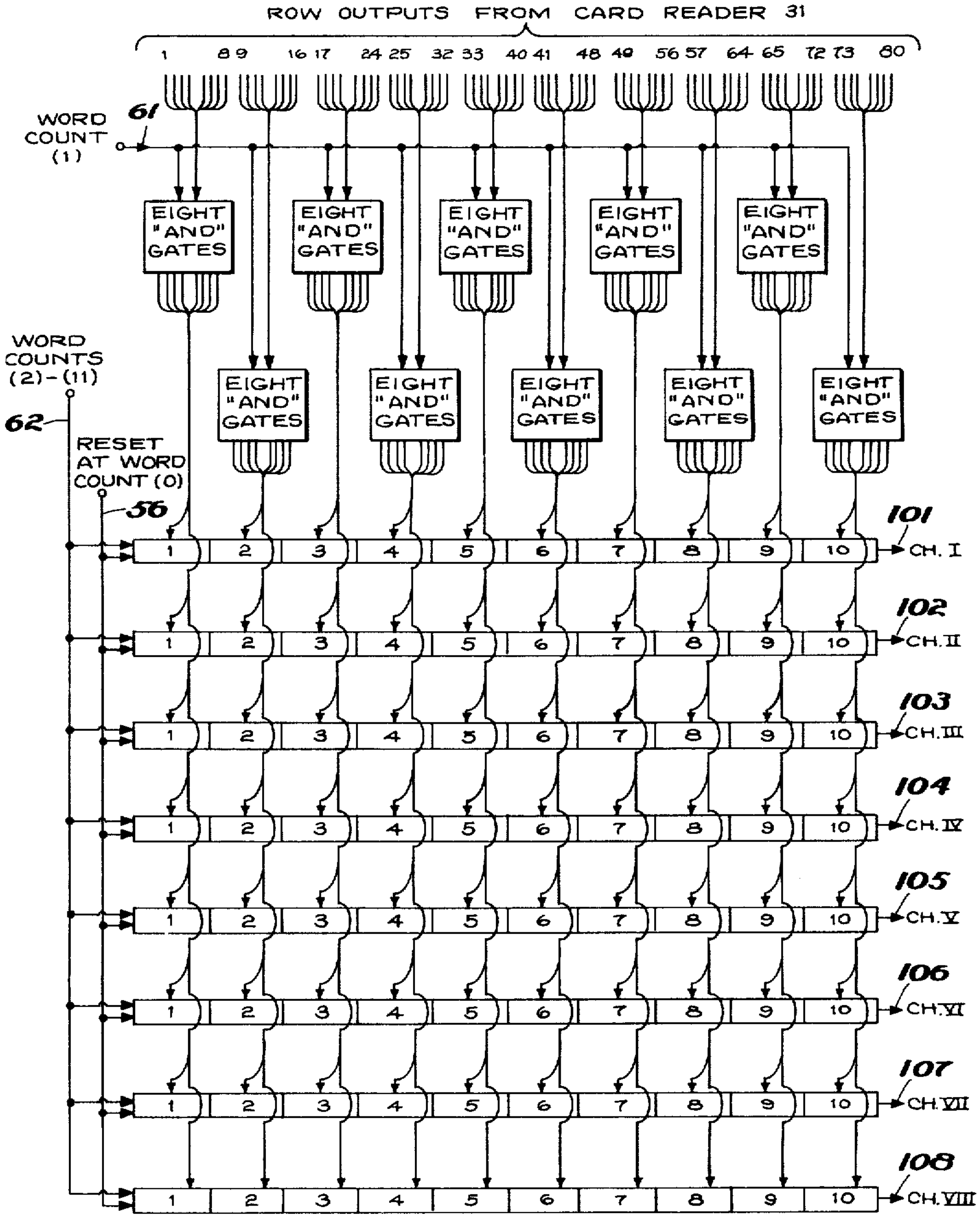

A detailed form of row assembler 60 is illustrated by FIGURE 6. It shows eight shift registers, each having a ten bit length. Their respective outputs connect to leads 101–108 to provide synchronous data for the eight transmitter channels.

Nonsynchronous information is provided to the row assembler by the 80 leads from card reader 31. The information is input-synchronized with sequencer count (1) received on lead 61. Input-synchronization is accomplished with 80 "and" gates, shown as ten sets of eight "and" gates in FIGURE 6. In each set eight separate gates handle the respective eight bits of information comprising one word in the transmitted output. Thus, the first set of eight gates is connected to the respective first bistable sections of the eight shift registers. In a like manner, the second set of gates have outputs connected to the second sections of the shift registers, etc., through the tenth set of gates.

As explained above, sequencer word count (0) on lead 56 occurs only at the start of a card. It is used to reset all of the shift-register bistable sections to their zero state. Sequencer word count (1) occurs at the beginning of each row and enables the "and" gates to simultaneously set the eighty bistable sections of the shift registers according to the data of an entire row within the time of a single $F_1$ period. During this input period, an SOR word is transmitted. The ten succeeding sequencer counts (2)–(11) provided on lead 62, provide the shift timing for the registers, which shift out the stored data a word at a time in synchronism for transmission with the next ten $F_1$ periods. After all of the data is shifted out, the registers remain in a zero or reset condition for reception of another row of data with the next SOR pulse.

*Spacer Encoders*

FIGURES 9(A), (B), and (C) illustrate SOC, SOR and NIF word encoders 59, 57 and 58. The word coding is arbitrary except that each must be different from the other to distinguish them. Since the coding is binary it merely involves selecting the proper one of two states, which are provided by opposite outputs from an inverter I receiving a respective timing input from respective leads 56, 61 and 64. The opposite inverter outputs are connected to the eight channel leads 101–108 according to assigned codings.

*Synchronizer 36 and Sequencer 41*

FIGURE 7 shows a more detailed arrangement of synchronizer 36 and its interconnections with sequencer 41. Sequencer 41 may be constructed as a conventional counter that can count from (0) through (15) with separate resetting inputs for reset to (0) and (1) respectively.

In synchronizer 36, a nonsynchronous card start pulse from lead 32 is synchronized by an $F_1$ timing pulse from lead 68, in an "and" gate 82 to provide a synchronous start of card pulse on lead 37. This lead is connected to the zero reset input of sequencer 41. Thus, each card start pulse synchronously resets sequencer 41 to output count (0). Sequencer output lead 56 provides output count (0) to row assembler 60 to reset it, and simultaneously activates start-of-card coder 59 to generate SOC words for the duration of the zero output state.

It takes a substantial amount of time between the injection of a card in the reader causing a sequencer count (0) to begin and the reading of the first row causing a sequencer count (1). Therefore, the sequencer remains at output count (0) for several $F_1$ periods, which causes the transmission of several consecutive SOC pulses.

When reader 31 reaches the first row, it generates a long nonsynchronous start-of-row pulse which is provided on lead 33 to an "and" gate 81 in synchronizer 36. The next $F_1$ pulse reaching gate 81 causes it to generate a synchronous start-of-row pulse, which is provided on lead 38 to set sequencer 41 to output count (1). Sequencer output count (1) is provided on lead 61 to row assembler 60, which instantly stores all of the data of the row, and to SOR coder 57 to cause transmission of an SOR word.

Each start-of-row pulse also sets up synchronizer 36 to pass a particular number of $F_1$ pulses to lead 39, which provides an input of sequencer 41. These $F_1$ pulses run the sequencer output count up to 12, where it remains until reset to zero by the next start-of-card pulse. Eleven $F_1$ pulses are passed to lead 39 after each of the first nine row start pulses. This is done as follows: A bistable circuit 84 is set by each row-start pulse from reader 31 to enable an "and" gate 83 which receives $F_1$ timing pulses. When the eleventh $F_1$ pulse is provided through gate 83, the sequencer output moves to count (12); which is provided on a lead 42 through an enabled "and" gate 86 and an "or" gate 90 to reset bistable circuit 84. The resetting of circuit 84 disables "and" gate 83 and prevents any further $F_1$ pulse from passing through it beyond the eleventh. Hence, sequencer 41 remains on output count (12) until it is reset by the next row-start pulse.

The sequencer repeats this cycle after each row-start pulse except the last one of a card.

At the start of last row 10, a non-synchronous pulse is provided on lead 34. It signals the sequencer that it should not stop at count (12), but should continue to count (15) and remain there until the next start-of-card pulse is read. The pulse on lead 34 sets a bistable circuit 88, and its outputs 93 and 94 then disable gate 86 and enable an "and" gate 87. Bistable circuit 84 also receives the last row start pulse on lead 33 and is set in the same manner as by previous row start pulses to enable gate 83, which starts passing a sequence of $F_1$ pulses, as before. However, upon output count (12) being reached, it finds gate 86 disabled and thus cannot reset bistable circuit 84. Hence, gate 83 remains enabled to pass more $F_1$ pulses, which run the output count beyond (12). As the sequencer goes through counts (12) and (13), it provides the parity timing, which is utilized by a parity generator, not shown herein. But when the sequencer reaches count (15), an output trigger is provided on a lead 43 which passes through gates 87 and 90 to reset bistable circuit 84 and simultaneously resets bistable circuit 88. Upon reset, gate 83 is disabled to block $F_1$ pulses beyond the fifteenth to lead 39. The resetting of bistable circuit 88 disables gate 87 after the pulse has passed through it and enables gate 86 for its normal operation.

Hence, sequencer 41 remains at count (15) until the injection of the next card causes a card-start pulse from the reader. Sequencer counts (14) and (15) cause outputs on leads 47 and 43 through "or" gate 63 to actuate NIF coder 58 to generate NIF words during the existence of these counts. Since the sequencer stays at count (15), until the next card is started, the spacer time interval between groups (cards) is automatically filled with NIF words.

*Delayer 44*

Delayer 44 insures that the maximum read group rate cannot overtake the writer and insures that parity information can be transmitted before beginning the next card. Thus, the amount of delay assures that the conditions of Expression 1 above are met. Delayer 44 is triggered by sequencer count (15), which occurs only after a card is completely read. At the end of the delay caused by delayer 44, magnetic clutch 35 is again enregized so that reader 31 can again begin its normal non-synchronous operation by inserting the next card and repeating the entire group cycle.

*Parity Timing Generator 71*

Parity timing generator 71 includes a pair of "and" gates 72 and 73, which have inputs that connect respectively to leads 42 and 48 to receive sequencer output counts (12) and (13). Another input of each "and" gate is connected to output 94 of bistable circuit 88, so that the gates are enabled only during the last row. This prevents count (12) from causing an output after rows other than the last since count (12) is the last count of the other rows.

RECEIVING SYSTEM EMBODIMENT

FIGURE 8 illustrates a system for receiving the information transmitted from the embodiment in FIGURE 5. The receiving system includes a synchronous receiver 110 that receives the transmitted information and provides the eight channels on respective output leads 121–128 in the same form as was provided to leads 101–108 at the transmitter.

An NIF detector 113 is included with a timing synchronizer 111 connected with receiver 110 to detect NIF words and use their timing to derive a synchronizing wave $F_1'$, which is provided on a lead 112. For example, a highly stable oscillator may be phase locked to the NIF detected bits and used as the source of $F_1'$ timing pulses. Thus, timing pulses $F_1'$ are word synchronous with the received signal. The data output of receiver 110 loads a buffer storage device 133. The buffer storage 133 is receptive to the information only and is not receptive to NIF, SOC or other types of information used only to direct the operation of the writer without appearing in the writing. The load sequencing of buffer storage means 133 is accomplished with the assistance of an SOC detector 131, an SOR detector 132, and SOC immunity gate circuit 139, a load row counter 142, a "load word counter" 143, and a "word-count control circuit" 146.

Preferably, an initial reset switch 109 is pushed prior to start of reception operation to assure that counters 142 and 143 are reset to their last counts (14) and (15), which readies them for a reception sequence.

Start-of-card (SOC) detector 131 and start of row (SOR) detector 132 have inputs respectively connected to leads 121 through 128. Detector 131 provides an output pulse on lead 138 to immunity gate circuit 139, upon the reception of a SOC word.

Circuit 139 provides an output pulse only upon the simultaneous reception of at least two SOC pulses. Accordingly, false noise pulses provided on lead 138 can not actuate the system, since it is unlikely that two noise pulses will occur with the required word synchronism.

The first SOC pulse on lead 138 passes through gate 139 on lead 135 to trigger row counter 142 to its zero output count, which is fed back to circuit 139. If a second consecutive SOC pulse does not occur during the next word period as determined by the next occurring $F_1'$ timing pulse from lead 112, circuit 139 provides an output pulse to lead 141, which resets counters 142 and 143 back to their original states (14) and (15) respectively, so that a card write cycle does not begin.

However, when a card is transmitted, at least two consecutive SOC pulses follow on lead 138. The second SOC pulse causes circuit 139 to provide a pulse on lead 140 that triggers the row counter to count (1) Furthermore, the termination of count (0) on lead 151 prevents circuit 139 from providing a resetting output to lead 141.

Row count (1) also is provided as an input to word counter 143 to reset it to output count (0). Upon detection of the first SOR word, a pulse is provided by lead 144 to word counter 143 to trigger it to output count (1). Upon being triggered to count (1), word counter 143 signals control gate 146 to pass a sequence of $F_1'$ timing pulses to a lead 163. Eleven $F_1'$ pulses are passed for all rows but the last to trigger counter 143 up to count (12), where it remains until the next SOR pulse is provided. For last row ten, fourteen $F_1'$ pulses are passed to trigger counter 143 to count (15), where it remains until the next card is signalled.

To accomplish these functions control gate 146 receives inhibiting word counts (0), (12) and (15). They inhibit the release of $F_1'$ pulses by gate 146. Thus, when word counter 143 is set to count (1) by an SOR pulse, the inhibiting (0) count is removed from gate 146 and $F_1'$ pulses pass through it to lead 163 to run up the word count in synchronism with the $F_1'$ timing. When word count (12) is reached, an inhibiting input is applied that prevents any further release of $F_1'$ pulses. Hence, counter 143 stays at count (12) until the next SOR pulse is received.

Each word count (2) is fed to row counter 142 by lead 164 to advance it one row count for every SOR pulse from detector 132. The advance of row counter 142 from counts (2) through (11) is indirect because it occurs through word counter 143. That is, every time word counter 143 passes through count (2) which occurs once per row, row counter 142 is advanced to its next count.

When last row ten is reached, it is signified by row counter 142 reaching count (11), which is provided to control gate 146 to signal it to pass fourteen $F_1'$ pulses until blocking word count (15) is reached. After the last row, word counter 143 remains at count (15) until the next SOC word sequence is received.

The ten word counts (2)–(11) are provided on lead 171 to synchronize the data loading operation of buffer storage device 133.

Buffer storage 133 may be any of several types of random-access or sequential storage devices, since its unload rate is different from its load rate. Thus, it might be a cathode-ray type storage device, a magnetic drum or disc, or magnetic cores arranged in X—Y planes. The latter is preferred.

It is required that the load and unload operations not be coincident. A buffer timing source 134 is provided with two output leads 136 and 137 providing time-interleaved pulses P and $\overline{P}$ at a rate that is more than ten times the $F_1'$ rate. All loading is synchronous with P pulses, and all unloading is synchronous with $\overline{P}$ pulses. Hence, coincidence cannot exist.

The load and unload operations each require two types of signalling. A buffer load synchronizer 147 receives pulses P and passes one pulse P to a lead 178 per word count, provided on leads 171 or 181. Hence, one P is provided on lead 178 per word to be written that is received on leads 121–128.

The non-synchronous card writing operation is delayed until at least a part of a card is stored in buffer 133, as explained previously. In this embodiment, three rows (blocks) of storage are provided prior to the writing operation; and the storage delay is measured by row counter 142. Since its counts correspond to the starts of the respective rows of a card, a delay time is specified by the time between the beginning of a card (SOC pulse) and the beginning of its fourth row (fourth SOR pulse). Row count (5) signifies the beginning of the fourth row.

A clutch-control bistable circuit 201 is set by count (5) received on a lead 200. Upon being set, bistable circuit 201 provides an output to a magnetic clutch 202 which activates the writing operation of card punch 203, which continues running at its non-synchronous rate as long as this output from bistable circuit 201 remains.

As card punch 203 begins and continues its non-synchronous operation, it directs its own operations by a set of pulses emitted by it as it starts a card and as it starts each row. Its start-of-card pulse is generated as soon as circuit 201 is energized, and the pulse is provided by a lead 250 to a buffer unload sequencer 205. All emitted start-of-row pulses are provided to sequencer 205 by a lead 206; and at the start of the last row only, a pulse is also provided on another lead 207 to the unload sequencer.

Upon the emission of any start-of-row pulse, an entire row is quickly unloaded from buffer storage 133 into a row assembler 260 by the next twenty $\overline{P}$ pulses provided by lead from sequencer 205. Because of the high rate of the P pulses, the operation of unloading a row into the row assembler occurs in less than two $F_1'$ word periods. Prior to receiving information, row assembler 260 is reset by a sequencer pulse on lead 230 as a start-of-row pulse is being emitted. Then, words are unloaded one at a time from leads 261–268 into row assembler 260 with the ten sequencer pulses provided separately on leads 231–240. A following sequencer pulse on lead 241 causes the stored information in row assembler 260 to simultaneously transfer its 80 bits of information to card punch 203 with sufficient power to drive the punches where card holes are signified.

Detailed considerations of the more complex items in the receiving system embodiment follow:

*Spacer Decoders*

FIGURES 10(A), (B), and (C) illustrate decoders for the "start-of-card," "start-of-row" and "NIF" words that are received. Basically, each of the decoders is the same. Each comprises three "and" gates. One "and" gate has four inputs connected to those channels on which a "1" occurs, when its coded word is received. Likewise, another "and" gate has four inputs connected to those channels on which a "0" occurs upon the receipt of its coded word. A third "and" gate has inputs connected to the outputs of the first pair of gates. Thus, coincidence of its inputs occurs only upon receipt of the assigned word of the decoder. Thus, the only difference between the various decoders is in the order of their input connections.

*Buffer Input Timing Circuitry*

FIGURE 11 illustrates in detail the circuitry which controls the input loading cycle of buffer storage device 133. The buffer input timing circuits include immunity gate circuit 139, load row counter 142, load word counter 143, word count control circuit 146, and buffer load synchronizer 147. The entire purpose of these circuits culminates in providing selected P timing pulses on leads 177 and 178 to buffer 133; so that it can accept the received information, and signal the writer when it should start writing.

Immunity circuit 139 and row counter 142 act cooperatively at the start of a card. Counter 142 may be a conventional electronic counter capable of at least fifteen counts in this embodiment. Some of these counts are not always used, which causes no difficulty. Word counter 143 may be a conventional counter that is capable of sixteen counts.

Initial operation of reset switch 109 in preparation for receiving information resets counter 142 to count (14) and counter 143 to count (15).

Immunity circuit 139 receives detected SOC signal pulses on lead 138 and receives $F_1'$ timing pulses from lead 112. Furthermore, circuit 139 receives an input from row counter 142 on lead 151, which provides a signal when the row counter is at count (0).

Immunity circuit 139 has four "and" gates 150, 152, 153 and 155. Each has an input connected to lead 151 which normally enables gate 152, but disables gates 150, 153, and 155. Only when row counter 142 is at count (0) does the signal on lead 151 reverse the enablement state of these gates, with gate 152 then being disabled and gates 150, 153, and 155 then being enabled.

Consequently, counter 142 is at count (14) at the occurrence of a first SOC pulse. It passes through gate 152 and sets counter 142 to row count (0). This reverses the enablement states of the gates, as explained in the previous paragraph. If a second SOC pulse follows on lead 138, it passes through gate 150 to trigger counter 142 to row count (1), and furthermore, triggers counter 143 to word count (0).

On the other hand, if the first pulse on lead 138 is a noise pulse, appearing as an SOC pulse, it is extremely unlikely that it will be followed by a timed second pulse. Thus, at the instant that a second SOC pulse is expected, an $F_1'$ pulse is applied to a delay multivibrator 154 through gate 153 enabled by the first pulse. One-shot multivibrator 154 provides a pulse delay between about ¼ to ¾ of an $F_1'$ period. The delayed pulse passes through then-enabled gate 155 to lead 141 and resets the counters back to their initial counts (14) and (15).

However, when a second SOC pulse occurs, row count (0) terminates to cause disablement of gate 155 prior to it receiving the delayed pulse. Hence, the delayed $F_1'$ pulse cannot pass to cause any reset of the counters when a consecutive pair of SOC pulses is provided.

After being triggered to row count (1) by SOC pulses, counter 142 is thereafter triggered once per cycle of word counter 143. A trigger pulse is provided on lead 164 each time word counter 143 passes through count (2) to move the row count up by one.

A write cycle is delayed until the fourth row is received. It is signified by the beginning of count (5) on lead 200, which starts the punching operation of card punch 203. Row count (5) starts with the beginning of the first word of the fourth received row, because word count (2) corresponds to the first received word of a row.

Moreover, the word count can be used to provide a fine adjustment for the delay in starting a writing cycle, since the word count represents a predetermined fraction of a row period. Thus, the write cycle could be delayed by as many tenths of a row period as desired by using later word counts than (2). Hence, by triggering the row counter through the word counter, a fine delay adjustment for the writing cycle is available, which may be needed where the maximum amount of available buffer storage is limited.

Word counter 143 is triggered to count (1) by the first received SOR pulse on lead 144 that immediately follows the received SOC pulses on lead 138. Each SOR pulse results in counter 143 being triggered through a sequence of counts due to the operation of word count control gate 146.

Word count control gate 146 permits a selected number of $F_1'$ pulses to pass through it to trigger word counter 143 in synchronism with the words in a received block of data. Gate 146 blocks $F_1'$ pulses when it receives counts (0), (12) or (15) from the word counter. Count (0) occurs prior to a data block, and counts (12) and (15) occur after a block.

Circuit 146 includes "and" gates 162, 166, and 167, a pair of "or" gates 161 and 165, and a bistable circuit 168. $F_1'$ pulses are applied to one input of gate 162. Its other input is disabled by any of word counts (0), (12), or (15), as applied through an "or" gate 161, either directly from counter 143 or through gates 166 or 167.

Bistable circuit 168 controls whether counts (12) or (15) can disable gate 162 at a particular time. Hence, the initial reset by switch 109 resets bistable 168 to enable gate 167, so that reset word count (15) passes through it to block gate 162. The first pair of SOC pulse causes row count (1) to set bistable 168 to disable gate 167 and enable gate 166. Furthermore, word count (0) simultaneously occurs to block gate 162.

However, an immediately following SOR pulse triggers counter 143 to word count (1) to discontinue blocking count (0). Thus $F_1'$ pulses begin to pass through gate 162. When word count (12) is reached, a disabling signal is applied through "and" gate 166 to gate 162 to block any further $F_1'$ pulses from triggering counter 143. Hence, it remains at word count (12) until the next SOR pulse is received on lead 144 to reset it back to word count (1). This cycle repeats after each SOR pulse except the last one of a card.

Upon the reception of the last row of a card, row count (11) is induced and bistable 168 is set to disable gate 166 and enable gate 167. Hence, $F_1'$ pulses are not blocked at word count (12), because it cannot pass through gate 166. However, when word count (15) is reached, it passes through gate 167 to block further $F_1'$ pulses. Consequently, the word counter remains at blocking count (15) until the next card is received.

Buffer load synchronizer 147 receives those counts of counter 143 that are timed with received words. They are counts (2)–(11) for all rows except the last, during which they are (2)–(13), wherein the last two correspond to parity words. Two separate leads 181 and 182 carry these respective count sequencies to prevent the repetitive last count (12) on rows other than the last from reaching synchronizer 147 and triggering load pulses.

Accordingly, gates 175 and 179 within synchronizer 147 have respective inputs connected to leads 181 and 182. Each gate has a second input controlled by bistable 168, which indicates the occurrence of the last row. Hence, gate 175 is normally enabled and gate 179 disabled, except during the last row when their enablement is reversed by bistable 168.

Synchronizer 147 also has bistable circuits 172 and 174 with "and" gates 173 and 176. Each word count passes through gate 175 or 179 to set bistable 172 and enable gate 173. The first P pulse thereafter provided on lead 136 passes through gate 173 and operates two-fold: as a trigger pulse that sets bistable 174 to enable gate 176, and as a feedback pulse that resets bistable 172 to disable gate 173 and block all following P pulses until the next word count.

Since gate 176 is enabled in response to the first P pulse, the next occurring P pulse passes through it and operates two-fold to provide a buffer-shift pulse on lead 178 that immediately follows the load pulse on lead 177, and to provide a feedback pulse that resets bistable 174 to disable gate 176 and block any further P pulses from passing until the next word count.

*Buffer Unload Sequencer 205*

FIGURE 12 illustrates in more detail unload sequencer 205 and its surrounding items. The unload sequence is started by unload row count (5) which sets clutch-control bistable circuit 201 to provide an output on lead 210 that engages clutch 202 to begin a non-synchronous card writing operation for card punch 203. In response to the writer, the sequencer causes the buffer to unload a row, one word at a time, into row assembler 260.

Sequencer 205 includes an "and" gate 214 that has an input connected to lead 137 to receive $\overline{P}$ timing pulses. Another input to gate 214 is provided by the output of a bistable circuit 213. It enables gate 214 when set by a non-synchronous row start pulse emitted by the card punch mechanism to lead 206 as the writing operation commences for a card. Each row-start pulse emitted by the writer results in a sequence of $\overline{P}$ pulses being passed through gate 214 to a lead 224 that provides the buffer unload timing to unload it into row assembler 260.

An unload word counter 227 has an input connected to a lead 218 to receive selected $\overline{P}$ pulses. Counter 227 may be a conventional counter with at least fourteen counts. Initially, switch 109 is used to reset counter 227 to count (13) and to reset bistable 213 to block $\overline{P}$ pulses. After a row-start pulse, bistable 213 is set and $\overline{P}$ pulses are provided through gate 214. Every passed $\overline{P}$ pulse adds an unload word count to counter 227 to run its count up to (11) on all rows except the last. During the last row, it counts up to (13).

The stoppage of counter 227 at counts (11) and (13) is obtained by means of a pair of "and" gates 211 and 212. They have outputs connected in common to a bistable circuit 208 that distinguishes between the last row and other rows of a card being written. To do this, bistable circuit 208 is reset initially by a writer emitted SOC pulse on lead 250, so that it enables gate 211 and disables gate 212. Thus, when count (11) is reached, it passes through gate 211 and resets bistable 213 to stop any further input of $\overline{P}$ pulses.

However, in the case of the last row, an emitted SOR pulse is received on lead 207 which sets bistable circuit 208 to disable gate 211 and enable gate 212. Thus, when counter 227 reaches unload count (11), gate 211 is blocked and bistable 213 is not triggered. Accordingly, gate 214 continues to pass $\overline{P}$ pulses. However, when unload count (13) is reached, it passes through gate 212 to disable gate 214 and stop any further passage of pulses $\overline{P}$.

Unload counts (11) and (12) after the last row provides timing for a parity comparator (not shown), which has data inputs connected to buffer output leads 261–268, as shown in FIGURE 8. The parity comparator, therefore, will not be explained in any further detail.

It was seen that the non-synchronous card writing operation was started by count (5) from load row counter 142. After a card is completely written, the writer is stopped by a pulse applied to the reset input of circuit 201. The stop pulse is count (13) on lead 251 from unload counter 227 and is applied through an "or" gate 235 to the reset input of control circuit 201. Thereafter, clutch 202 is not engaged until the buffer delay time expires for the next received card.

*Output Row Assembler 260*

It is shown in detail in FIGURE 13. Basically, output row assembler 260 comprises 80 flip-flop storage units, numbered 1 through 80, in which the 80 bits of a row are assembled to enable simultaneous actuation of up to an entire row of hole-punchers within card punch 203. The flip-flops in assembler 260 are of the power type so that they can drive the punches when called upon to do so. As shown in FIGURE 13, there are ten banks of eight "and" gates. In each bank, the "and" gates have respective inputs connected to different buffer leads 261–268. The other input of each gate in a bank is connected in common to a respective one of the sequencer leads 231–240. Thus, each bank enables transfer of one word from buffer 133 into assembler 260. Accordingly, the eight separate outputs of a bank are connected to inputs of eight consecutively-numbered storage flip-flops.

Prior to transfer from the buffer, the entire eighty flip-flops are reset by sequencer count (0) on lead 230 to assure a uniform setting of (0) storage. Hence, they are triggered by a data "1" and not triggered by a data "0" from the buffer 133 as the data is transferred a word at a time in response to sequencer counts (1)–(10). After all eighty flip-flops have had an opportunity to be reset by a row of buffer data, they are simultaneously activated by sequencer count (11) on lead 241 to release their stored data to the punchers.

Hence, card punch 203 operates non-synchronously punching out cards 204 that are duplicates of cards 30 from information which was synchronously received.

It is thus apparent to those skilled in the art that the embodiment can easily be modified to handle cards with more rows or columns or to use more or less channels of synchronous communication by correspondingly modifying the described components of the embodiment.

The principles of the invention have been described and illustrated in an operative system for the purpose of teaching those skilled in the art how the invention may be performed. Changes in the components, units and assemblies will appeal to those skilled in the art, and it is contemplated that such changes may be employed, but yet fall within the spirit and scope of the claims that are to follow.

I claim:

1. A system for bit-synchronously transmitting from a non-synchronous data reader to a nonsynchronous data writer, wherein the data is classified into units having a predetermined number of data bits, comprising storage means connected to said reader for receiving nonsynchronous data as it is being read, said storage means storing at least part of said predetermined number of data bits of one of said units, a data-bit timer, and a data transmitter synchronized by said timer, means connected with said timer for bit-synchronously sequencing portions of said data in parallel from said storage means to said transmitter, said transmitter transmitting said sequenced data bit-synchronously to a transmission medium, time-spacer means being interconnected with said reader to momentarily interrupt the operation of said nonsynchronous reader between readings of said units to reduce its average read rate below an average write rate of said nonsynchronous writer, said time spacer means being constructed to momentarily interrupt said operation a time interval equal to an integral multiple of a synchronous bit period.

2. Means for operating a nonsynchronous data writer with synchronously received data, wherein the data is received in units having a predetermined number of data bits, comprising means for receiving said data, a writer delay control means connected between said receiving means and said writer, said writer delay control means starting a writing operation of said writer a predetermined time after the beginning of each predetermined amount of received data, said writer delay control means stopping said writer after the writing of each predetermined number of data bits, and a buffer storage device connected between said receiving means and said writer for storing received information until written by said writer.

3. A system for bit-synchronously communicating between a nonsynchronous data reader and writer, wherein binary data is read in groups, each group including a plurality of blocks, comprising a block storage device capable of storing the data of one block, said storage device being connected to said reader to receive data as it is nonsynchronously read, a data transmitter, and a data synchronizer and sequencer interconnected with said storage device and said transmitter; a data bit timer providing a synchronizing output to said storage device, said synchronizer and sequencer, and said transmitter; said synchronizer and sequencer synchronously transferring data from said storage device to said transmitter sequenced for transmission, said bit timer having a synchronous rate faster than the fastest nonsynchronous operating rate of said reader, a receiver for receiving a signal transmitted from said transmitter and providing the transmitted data as a synchronous output signal, writer start-stop control means being connected between said receiver and said writer, said control means starting said writer at a predetermined fraction of a received group and stopping said writer after each group has been written, a buffer storage means connected between said receiver and said writer, said buffer storage means storing said group between reception and the writing thereof, and said writer having a slowest nonsynchronous operating rate which is faster than said synchronous transmission data rate.

4. A system for bit-synchronously transmitting data from a nonsynchronous data reader to a nonsynchronous data writer at remote locations, wherein binary data is read in groups, each including a fixed number of data bits, comprising a storage device capable of storing data of at least a part of any group, a data transmitter, a data synchronizer and sequencer connected between said reader and transmitter; a data bit timer providing a synchronizing output to said storage device, said synchronizer and sequencer, and said transmitter; means for signalling the start of a group connected to said transmitter, said sequencer synchronously interposing said start of group signalling prior to each group being synchronously transmitted.

5. A bit-synchronous communication system defined in claim 4, in which receiving means detect a synchronously transmitted signal from said transmitter, said receiving means providing an output including each start of group signal followed by data of a group, means for counting bits in each received group, said counting means being reset by each start of group signal, a writer start-stop control means being connected between said counting means and said writer, said writer control means starting said writer at a predetermined bit count of each received group, and said control means stopping said writer at the end of each written group, storage means connected to the output of said receiving means for storing data as it is synchronously received, a receiver synchronizer and sequencer interconnected with said storage means and said writer for unloading and sequencing the data from said storage means to said writer as called for by the nonsynchronous operation of said writer.

6. A system for bit synchronously transmitting data of perforated cards being read by a nonsynchronous data reader, wherein each row is read simultaneously by said reader, comprising a row assembler for storing each row immediately after it is read, said reader providing a nonsynchronous start-of-card signal at the beginning of a card and providing a nonsynchronous start-of-row signal at the beginning of a row, a bit timer for determining a bit synchronism for said transmitting system, a synchronous transmitter connected with said bit timer, a start-of-card coder, and a start-of-row coder, a transmit synchronizer for synchronizing the start-of-card and start-of-row coders to provide synchronous signals prior to transmission of card data and subcard row data respectively, a sequencer connected to said row assembler for transferring data from said assembler to said transmitter in a predetermined parallel sequence, and said transmitter having a number of channels at least equal to the number of parallel bits in said predetermined sequence, and each parallel sequence being transmitted during one bit period of said timer.

7. A transmitting system as defined in claim 6, in which a no-information coder is provided, said no-information coder being connected to said synchronizer and sequencer, and to said transmitter to transmit no-information signals between cards and between card rows.

8. A transmitting system as defined in claim 6 comprising delayer means connected to said reader for interpreting its operation, said delayer means being connected to said synchronizer for actuation at the end of each card that is nonsynchronously read to control the maximum card reading rate, means for providing parity information during the period of said reader interruption by said delayer means, and said parity means being connected to said sequencer and said synchronizer for timing thereof during transmission.

9. A system for bit-synchronously receiving data and having it written by a nonsynchronous data writer, wherein the data is received in groups having a predetermined number of data bits, with each group being preceded by a start-of-group signal, comprising receiving means for synchronously detecting said start-of-group signals and said data bits, storage means connected to the output of said receiver for storing said received data until it is written, first counting means for numbering bits of data in a received group, said first counting means being reset by each received start-of-group signal, writer control means interconnected with said first counting means and said writer, said writer control means triggering the nonsynchronous writing operation of said writer in response to a predetermined count of said first counting means, a second counting means interconnected with said writer and said storage means to control a nonsynchronous output sequence of said data from said storage means to said writer, said writer providing signals to said second counting means for indicating its position while writing a group, said second counting means connected to said control means and signalling the end of a group being written by said writer by a predetermined count of said writer signals, said control means stopping the writing operation of said writer at the end of a written group as signalled by a count of said second counting means.

10. A system for bit-synchronously including a receiver for receiving data and having it written by a nonsynchronous data writer, wherein binary data is received in groups, which are subdivided into a predetermined number of received blocks, each group being preceded by a start-of-group signal, and each block being preceded by a start-of-block signal, comprising synchronous means for receiving said signal, a start-of-group signal detector and a start-of-block signal detector each having input terminals connected to the output terminals of said receiver, storage means being connected between the output of said receiver and said writer, storage load counting means being connected to said start-of-group detector and being reset therefrom, a receiver timing source being synchronized with the received data bits, said timing source being connected to said load counting means to assist a counting of bits in a received group, a writer control bistable means having a first input connected to said load counting means, said control means being triggered by a predetermined count of said load counting means to provide an output to said writer to begin a nonsynchronous writing operation, an unload counting means having outputs connected to said storage means and having inputs connected to said writer, said writer signalling said unload counting means whenever the writing of a block is begun, a high rate pulse oscillator, gating means connected between said oscillator and said unload counter and being interconnected with said writer, said gating means being triggered by signals from said writer to pass pulses proportioned to the data received by said writer, said unload counting means indicating by a particular count the end of a written group, a reset input of said control circuit input being connected to said unload counter means and being triggered by the particular count to stop the writing operation of said writer.

11. A system for bit-synchronously receiving data and writing it with a nonsynchronous writer, wherein said data is received in parallel form, simultaneous parallel bits being a word, a plurality of words comprising data of a row of a perforated card, and a plurality of said row data comprising the entire data of a perforated card, each card being preceded by a start-of-card signal, and each row being preceded by a start-of-row signal, synchronous receiving means for detecting said signal, a buffer storage device connected to the output of said receiving means for receiving said words synchronously, row assembler storage being connected between said buffer storage device and said writer for rearranging the order of data into rows for perforation of a card by said writer, a start-of-card signal detector, and a start-of-row signal detector, each detector being connected to said synchronous receiving means, load row counting means, and load word counting means, means connected between said start-of-card signal detector and said load row counting means to reset it in response to a start-of-card signal, said start-of-row signal detector being connected to said load word counting means to reset it by each start-of-row signal, a timing source synchronized with the received bits, means for connecting said timing source to said load word counting means, and an output of said load word counting means being connected to said load row counting means to increase its row count by one digit after each start-of-row signal, said load word counting means being actuated by said timing source in synchronism with the received words to a count higher than the number of words of a row, a writer control bistable circuit having a set input connected to said load row counting means and having an output connected to said writer, a predetermined count of said row counting means setting said bistable circuit to start the nonsynchronous operation of said writer, said writer providing nonsynchronous pulses at the start of each row, a storage unload sequencing counting means being connected to said writer to receive its nonsynchronous pulses, said sequencing counting means being connected to said row assembler to signal it to unload a row of data into said writer with each start-of-row signal provided from said writer, said sequencing counting means also connected to said buffer storage device to time its unloading operation into said row assembler storage, and said sequencing counting means being connected to a reset input of said bistable circuit, a count of said sequencing counter corresponding to the end of a last row of said card being written provided to said reset input, said control bistable circuit providing a stop output for the writing operation in response to reset of said bistable circuit.

12. A receiving system as defined in claim 11 in which no-information signals are synchronously received whenever data is not being provided by a transmitted signal, no information signal detector means being connected to said receiver and said synchronous timing source to assist its synchronization.

References Cited in the file of this patent

UNITED STATES PATENTS

| | | |
|---|---|---|
| 2,702,380 | Brustman | Feb. 15, 1955 |
| 2,892,185 | Briggs | June 23, 1959 |
| 2,895,124 | Harris | July 24, 1959 |
| 2,907,010 | Spielberg | Sept. 29, 1959 |
| 2,975,228 | Doty et al. | Mar. 14, 1961 |